No. 862,797.
PATENTED AUG. 6, 1907.
L. J. B. BOUCHER.
LOCKING NUT AND BOLT.
APPLICATION FILED NOV. 7, 1905.
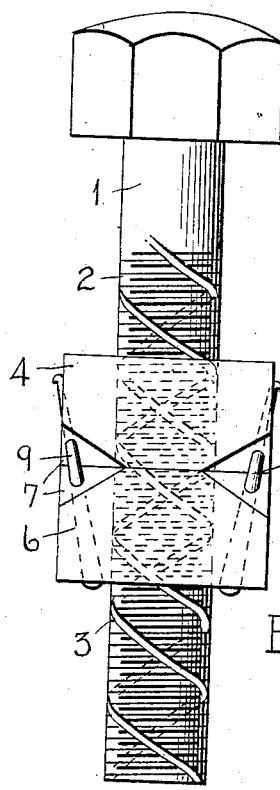
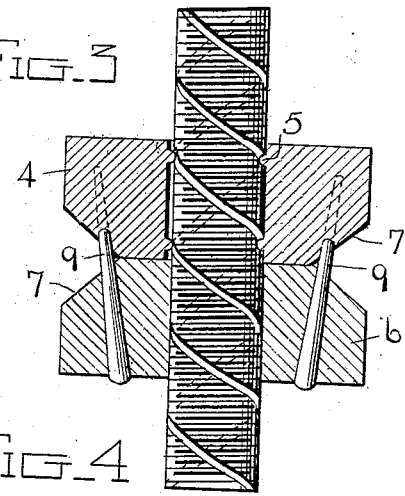
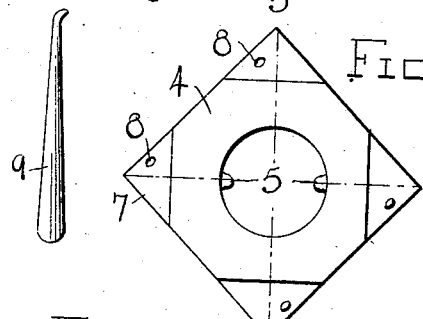
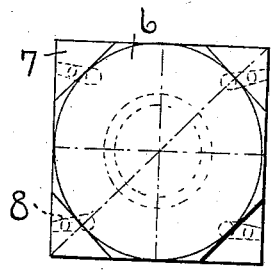
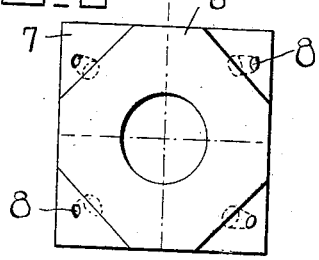
Witnesses
L. B. James
S. W. M'Coll
Inventor
L. J. B. Boucher
by H. B. Willson & Co.
Attorneys

UNITED STATES PATENT OFFICE.

LEON JEAN BAPTISTE BOUCHER, OF BOURGES, FRANCE.

LOCKING NUT AND BOLT.

No. 862,797.  Specification of Letters Patent.  Patented Aug. 6, 1907.

Application filed November 7, 1905. Serial No. 286,279.

*To all whom it may concern:*

Be it known that I, LEON JEAN BAPTISTE BOUCHER, doctor of medicine, a citizen of the Republic of France, residing at Bourges, Cher, 1, Rue Michel Servet, have invented certain new and useful Improvements in Locking Nuts and Bolts, of which the following is a specification, such as will enable others skilled in the art to which it appertains to make and use the same.

This invention relates to locking nuts and bolts and comprises a bolt with two reverse screw-threads on to which two nuts are screwed in opposite directions and fixed together by means of pins.

Referring to the drawings which form a part of the specification Figure 1 is an elevation of the bolt with the two nuts screwed on. Fig. 2 a plan. Fig. 3 is a partial view of the bolt with the two nuts in section, Fig. 4 is a section of the first nut, the interior of which is smooth but has two projections; Fig. 5 is a plan of the same nut Fig. 6 a plan of the second nut Fig. 7 represents the conical fixing pin.

This bolt 1 (Fig. 1) consists of an ordinary bolt stem with a right handed screw thread 2 in the ordinary manner, and with a left handed coarse screw-thread or spiral groove 3 shown in Figs. 1 and 3. This spiral being more open than the screw-thread intersects it at an angle large enough not to diminish its strength. On the bolt thus formed two nuts are screwed. The first nut 4 is smooth inside (Figs. 4 and 5) but has two projections 5 which fit into the groove 3; when the projections have been introduced into the grooves, the nut 4 is screwed up tight. The second nut 6 (Figs. 2 and 6) is then put on and is screwed up in the usual way. It is screwed up tightly against the first nut, forming a counter-nut thereto, until the edges of the two nuts are quite parallel (Figs. 1 and 3).

It will be observed that the faces of the two nuts which must correspond are beveled at the four corners so as to leave between the two nuts a pyramidal space to permit the connecting pins hereinafter described to be severed when it is desired to separate the nuts. In the four bevel parts tapering holes 8 are drilled: the holes extending obliquely from the opening in the nuts, passing through the nut 6 and terminating at the sides of the nut 7 at a short distance from the outer faces of the nut. The taper holes can be brought into alinement but are interrupted in the middle by the pyramidal space left between the two nuts. (Figs. 1 and 3). A taper pin 9 made of soft iron or brass (Figs. 1 and 7) is inserted in each hole, the thinner end of the pin projecting through the reduced end of the hole in the nut 4. This pin, which is pushed in as far as it will go, projects through one side of the nut 4 and is secured by bending the small projecting end thereof at an angle by means of any suitable tool. The two nuts thus united by means of four pins are firmly fixed together and locked on the bolt. These nuts and bolts are very suitable for fixing the parts of a motor, as they will not shift under vibration because if one nut has a tendency to become unscrewed from left to right the other nut can only do so from right to left, and these two tendencies by opposing neutralize each other.

When it is desired to separate the nuts, the bent points of the pins must be straightened and the pin forced out; or preferably a flat file is introduced into the pyramidal space between the nuts and the pins cut in order to render the nuts independent of each other and to unscrew them in turn. The nuts may be put in order again by forcing out the fragments of the pins which remain.

With an extra set of nuts and pins repairs can always be easily and quickly effected.

Having now particularly described and ascertained the nature of my said invention and in what manner the same is to be performed I declare that what I claim as new and desire to secure by Letters Patent is:

1. In an improved nut lock, the combination with a bolt provided at one end with a right screw-thread and with a left coarse thread more open than the right screw-thread and intersecting it at an angle, of a right and a left nut adapted to be screwed on said bolt, said nuts having a plurality of corners with the contacting faces of said corners beveled and forming a pyramidal or V-shaped space between the two nuts when assembled, said nuts being provided with drilled holes in the beveled corners thereof, said holes extending obliquely from the center of said nuts towards their outer ends, and pins adapted to be inserted in said holes.

2. In an improved nut lock and bolt, the combination with a bolt provided at one end with a right hand screw-thread in the ordinary manner and with a left handed coarse thread more open than the right hand thread and intersecting it at a large angle, of a right and a left hand nut adapted to be screwed on said bolt, said nuts having the corners of their contacting faces beveled and forming a pyramidal space between the two nuts when assembled, said nuts being provided with four holes drilled in the four corners thereof and extending obliquely from the openings therein toward their outer faces, and four pins adapted to be inserted in said four holes.

3. In an improved nut lock and bolt the combination with a bolt provided at one end with a right handed screw thread in the ordinary manner and with a left handed coarse thread more open than the screw thread and intersecting it at a large angle, of a right and a left hand nut adapted thereto, the said nuts having the four corners of the contacting faces beveled and forming a pyramidal space between the two nuts and the nuts being provided with four holes drilled in the four corners thereof and extending obliquely from the inside to the outside and four pins inserted in the said four holes.

4. In an improved nut lock, the combination with a bolt provided at one end with a right screw-thread and with a left coarse thread more open than the right screw-thread and intersecting it at an angle, of a right and a left nut adapted to be screwed on said bolt, said nuts having drilled holes extending obliquely from the center thereof toward their outer ends, and pins adapted to be inserted in said holes.

In testimony whereof I have affixed my signature, in presence of two witnesses.

LEON JEAN BAPTISTE BOUCHER.

Witnesses:
PIERRE BARITZ,
HANSON A. COXE.